United States Patent [19]
Sprague

[11] 3,979,489
[45] Sept. 7, 1976

[54] METHOD OF MAKING CARPET UNDERLAY

[75] Inventor: George R. Sprague, Dyersburg, Tenn.

[73] Assignee: Colonial Rubber Works, Inc., Dyersburg, Tenn.

[22] Filed: June 26, 1975

[21] Appl. No.: 590,663

Related U.S. Application Data
[62] Division of Ser. No. 380,429, July 18, 1973.

[52] U.S. Cl. .................................. 264/51; 264/166; 264/219; 264/293; 264/322
[51] Int. Cl.² ........................................ B29D 27/00
[58] Field of Search ............ 264/322, 293, 51, 219, 264/166

[56] References Cited
UNITED STATES PATENTS

| | | | |
|---|---|---|---|
| 2,180,304 | 11/1939 | Minor | 264/293 X |
| 3,455,772 | 7/1969 | Mason | 161/122 |

FOREIGN PATENTS OR APPLICATIONS

| | | | |
|---|---|---|---|
| V5,018 | 1956 | Germany | 264/293 |
| 955,959 | 1964 | United Kingdom | 264/293 |

*Primary Examiner*—Richard R. Kucia
*Attorney, Agent, or Firm*—Reuben Wolk

[57] ABSTRACT

A method of making a carpet underlay is provided wherein the underlay is comprised of a sponge rubber body having a load-carrying surface defined by a plurality of cooperating closed-area coplanar portions which define the major part of the area of a plan view of such body.

3 Claims, 14 Drawing Figures

METHOD OF MAKING CARPET UNDERLAY

This is a division of application Ser. No. 380,429, filed July 18, 1973.

BACKGROUND OF THE INVENTION

There are numerous types of carpet underlay in present use which attempt to give a carpet associated therewith the feeling that it is made of a deeper and more luxurious pile and such present underlay ranges from sheets of compressible material having opposed parallel planar uninterrupted surfaces to sheets of compressible material having spaced upwardly convex or dome-like surfaces provided therein which define a top load-carrying surface. In general, the carpet underlay of the first-mentioned type does not provide the desired luxurious feeling for its associated carpet while carpet underlay of the second type does not provide a completely satisfactory load-carrying surface.

SUMMARY

This invention provides a method of making an improved carpet underlay, wherein the carpet underlay is comprised of a sponge rubber body having a load-carrying surface defined by a plurality of cooperating coplanar portions which define the major portion of the area of a plan view of such body; and, such carpet underlay provides a load-carrying surface of maximum area while providing a luxurious feeling for its associated carpet even though such carpet may be comparatively inexpensive.

Other details, uses, and advantages of this invention will be readily apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 7:
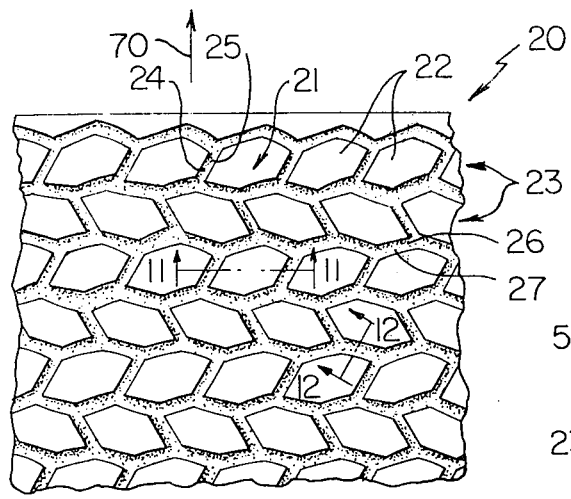
FIG. 7 is a fragmentary plan view illustrating one exemplary embodiment of a carpet underlay of this invention made using the apparatus and method of FIG. 1.
Figure 8:
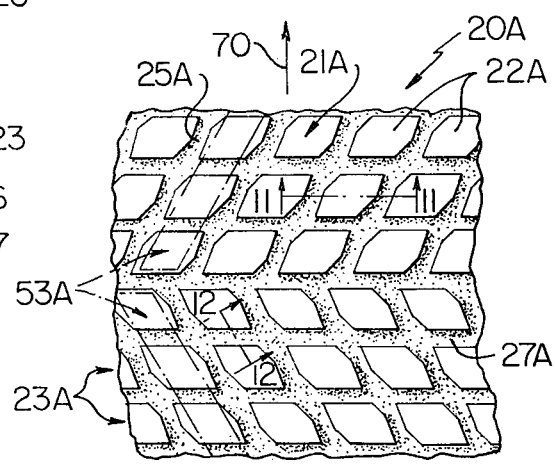
FIG. 8 is a view similar to FIG. 7 illustrating another exemplary embodiment of carpet underlay of this invention.
Figures 12, 13:
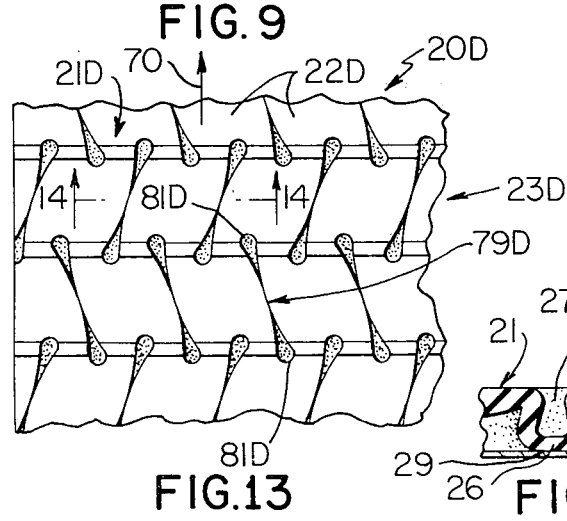
FIG. 12 is a cross-sectional view also not drawn to exact scale and being typical of a cross-sectional view taken essentially on the line 12—12 of each of FIGS. 7, 8, 9, and 10.
FIG. 13 is a view similar to FIG. 7 illustrating still another exemplary embodiment of carpet underlay of this invention.
Figures 11, 14:
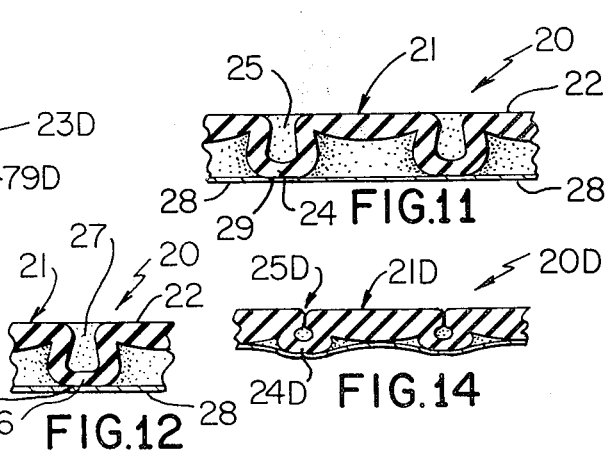
FIG. 11 is a cross-sectional view not drawn to exact scale and being typical of a cross-sectional view taken essentially on the line of 11—11 of each of FIGS. 7, 8, 9, and 10.
FIG. 14 is a view taken essentially on the line 14—14 of FIG. 13.

Reference is now made to FIGS. 7 and 11–12 of the drawings which illustrate one exemplary embodiment of the improved carpet underlay of this invention which is designated generally by the reference numeral 20 and such carpet underlay comprises a sponge rubber body having a substantially planar load-carrying surface as indicated generally at 21 which is defined by a plurality of spaced apart cooperating closed-area coplanar portions each designated by the same reference numeral 22. Each portion 22 is arranged in at least one associated row 23 with each pair of immediately adjacent portions in the row 23 being interconnected by an associated integral roughly U-shaped portion 24, see FIG. 11, which defines a channel 25 between the pair of immediately adjacent portions 22.

The portions 22 in the exemplary carpet underlay 20 are arranged in a plurality of parallel rows which for convenience will also be designated by the same reference numeral 23. Further, a pair of immediately adjacent portions 22 in adjacent parallel rows 23 are also interconnected by roughly U-shaped portions 26 of the sponge rubber body as illustrated in FIG. 12 and each U-shaped portion 26 also defines a channel 27 between such immediately adjacent coplanar portions 22.

The carpet underlay 20 has a backing material which may be a woven scrim material or other suitable nonwoven backing material, which is designated by the reference numeral 28 in FIGS. 11 and 12 and the material is suitably bonded or fixed as by heat sealing or similar process against the outer surfaces 29 of the bights of U-shaped portions 24 and 26.

The load-carrying surface 21, defined by the combined or total areas of closed-area coplanar portions 22, comprises a substantial part of the total area of a plan view of the carpet underlay 20, as viewed in FIG.

7 for example. In particular, such combined areas may define from 50 to as high as 90 percent of the total area of such plan view which is defined by the combined areas of the coplanar portions 22 plus the areas as viewed in plan view of the channels 25 and 27.

Figure 1:
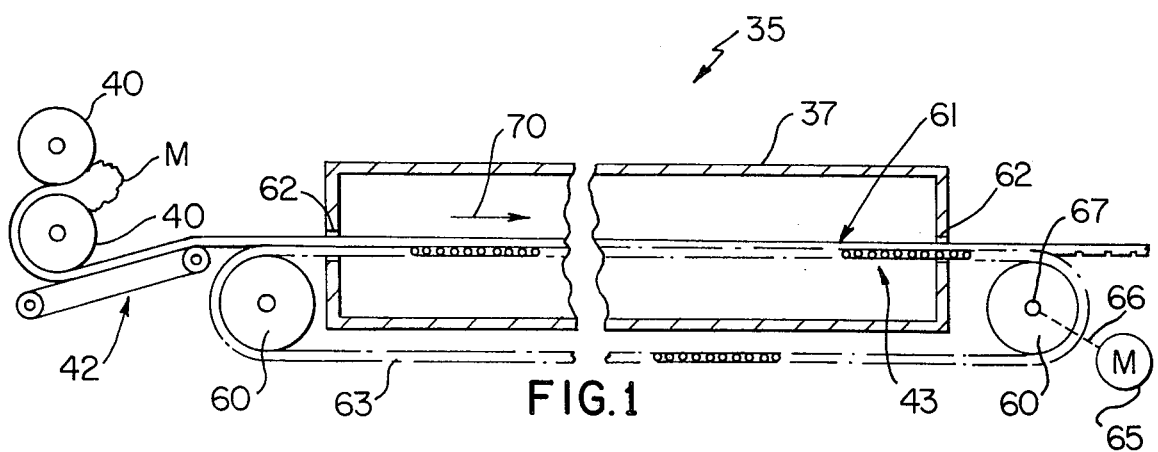
FIG. 1 is a view with parts in elevation, parts in cross-section, parts broken away, and parts shown schematically of one exemplary embodiment of an apparatus and method of this invention which may be used to make one exemplary embodiment of the improved carpet underlay of this invention, and which utilizes improved means for supporting a sheet of material used to define the carpet underlay.

Having described one exemplary embodiment of the carpet underlay of this invention, the detailed description will now proceed with a description of an improved apparatus and method which is designated generally by the reference numeral 35 in FIG. 1 and which may be used to make the carpet underlay 20. The apparatus 35 includes a device for providing a controlled environment for a web or sheet 36 of elastomeric material which is capable of foaming and vulcanizing and is adapted to define the carpet underlay 20 and such device may be in the form of an oven or heat tunnel 37 which is particularly adapted to provide a heated environment for the sheet 36.

The heat tunnel 37 may of any known construction and is provided with suitable controls of a type well known in the art to assure that once the sheet 36 is passed therethrough it is heated, expanded or sponged and vulcanized or cured in a manner well known in the art to produce the carpet underlay 20 of this invention.

As shown in FIG. 1, elastomeric material M, such as a rubber material or suitable plastic material, is processed by cooperating forming rolls 40, for example, or other suitable means, to define the sheet 36 and such sheet is received on a conveyor assembly 42 which in turn deposits the sheet 36 on the unique supporting means of this invention which is designated generally by the reference numeral 43 and which is used to support sheet 36 in the heat tunnel 37. The supporting means 43 assures the provision of the unique carpet underlay of this invention with its improved loadcarrying surface and improved rebound characteristics.

Figure 2:
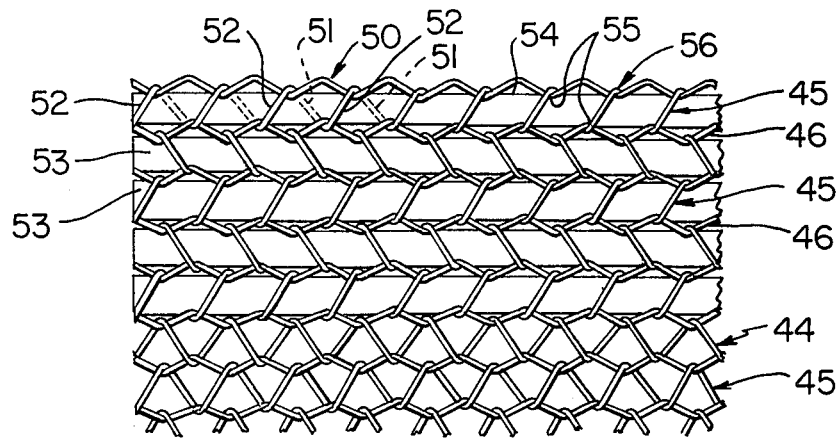
FIG. 2 is a plan view illustrating a fragmentary part of the supporting means comprising the apparatus of FIG. 1 and such supporting means is defined by a mesh material and cooperating elongated strip means with certain ones of such strip means being removed to better illustrate the mesh material.

The supporting means 43 is comprised of a mesh material 44, see FIG. 2, having a plurality of undulating members each designated by the reference numeral 45 and each immediately adjacent pair is held together by a common tie member 46 to define essentially a woven arrangement. As shown typically at 50 in FIG. 2 each undulating member 45 is comprised of a plurality or first set of parallel portions 51 which are adapted to be arranged in one plane and a plurality or second set of parallel portions 52 which are adapted to be arranged in a second plane which is parallel to the plane of the portions 51.

The supporting means 43 also comprises elongated strip means which in the example of FIG. 2 are shown as a plurality of elongated flat strips each designated by the reference numeral 53. Each flat strip 53 is supported by an associated undulating member 45 and in particular has its opposed large surfaces confined or sandwiched between the portions 51 and 52 of such member 45. In addition, each strip 53 has opposite side edges 54 which are confined between the inside surfaces 55 arranged opposite from each apex of each undulating member 45 as shown at 56 in FIG. 2. The strips 53 serve to define the coplanar portions 22 as will be described in detail subsequently.

As mentioned above, the supporting means 43 is comprised of the mesh material 44 and the strips 53 and such supporting means is in the form of an endless conveyor which is supported for movement in an endless path by a pair of cooperating cylinders each designated by the same reference numeral 60 in FIG. 1. Each cylinder 60 may be provided with suitable teeth, friction surfaces, or the like, so that upon rotation thereof the supporting means 43 is moved in an endless path with a top horizontal portion 61 of the supporting means 43 extending through the heat tunnel 37 by moving through suitable openings 62 in opposite ends thereof; and, in this example a lower horizontal portion 63 of the supporting means 43 is arranged beneath the heat tunnel 37. Any suitable means may be provided for moving the endless supporting means or conveyor 43 in its endless path and in this example a motor 65 is operatively connected by a mechanical connection, shown by dot-dash lines 66, to the shaft 67 of one of the supporting cylinders 60 so that upon rotating shaft 67 with the motor 65 the supporting means 43 is moved in an endless path passing the elastomeric sheet 36 carried on horizontal portion 61 through the heat tunnel 37.

Having described one exemplary embodiment of the carpet underlay 20 of this invention and an exemplary apparatus for making same, the detailed description will now proceed with a brief presentation of the unique method employed in making such carpet underlay and for this description particular reference is first made to FIGS. 1 and 2 of the drawings. In making the underlay 20 it will be noted that in the supporting means 43 the mesh material 44 is constructed and arranged relative to the cylinder 60 so that the elongated strips 53 are arranged substantially perpendicular to the direction of movement 70 of the conveyor through the heat tunnel.

Initially a forward end portion of the elastomeric sheet 36 is suitably attached to and supported on the top horizontal portion 61 of the supporting means or endless conveyor 43 whereupon motor 65 is energized to rotate shaft 67 and its associated cylinder 60 to thereby move the sheet 36 of elastomeric material through the heat tunnel 37 in a continuous manner.

As the sheet 36 moves through the heat tunnel 37 it is acted upon by the controlled heated environment thereof causing such sheet to soften and droop around the undulating members 45 and the tie members 46 of the mesh material 44. The heated environment also causes expansion by the generation and release of some gases from the sheet 36 as it continues through the heat tunnel 37 and the sheet is vulcanized or suitably heat cured.

Simultaneously with the expansion and heat curing of the sheet 36 the upper portions 52 of the undulating members 45 define channels 25 and cause the formation of U-shaped portions 24. Similarly, the tie members 46 define channels 27 and cause the formation of U-shaped portions 26. Finally, the strips 53 limit the drooping and control the expansion of the heated sheet to define the plurality of coplanar portions 22 which define the substantially planar load-carrying surface 21 of the carpet underlay 20.

The use of the strips 53 also assures that the sheet 36 will not droop and extend completely through the mesh material 44 as the sheet is moved through the heat tunnel 37 making it impossible with this construction of supporting means for the sheet 36 to droop and/or expand completely through the mesh material 44; and, this latter situation is a problem with apparatus proposed previously which only use mesh-type supports. In particular, such previously proposed apparatus often use flat supporting beds beneath the mesh supports and even with this added complexity in such previous apparatus the sheet stock generally droops completely through its mesh support requiring the sheet to be dragged across its supporting bed and thereby causing unsatisfactory movement and the production of an unsatisfactory carpet underlay.

Other exemplary embodiments of carpet underlay of this invention are illustrated in FIGS. 8, 9, 10, and 13–14. The embodiments of carpet underlay illustrated in FIGS. 8, 9, 10, and 13–14 ae similar to the carpet underlay 20; therefore, such embodiments of carpet underlay will be designated by the reference numerals 20A, 20B, 20C, and 20D respectively and representative parts of each carpet underlay which are similar to corresponding parts of the carpet underlay 20 will be designated in the drawings by the same reference numeral as in the carpet underlay 20 (whether or not such representative parts are mentioned in the specification) followed by an associated letter designation, eithe A, B, C, or D and not described again in detail.

The carpet underlay 20A has a substantially planar load-carrying surface 21A defined by a plurality of cooperating coplanar portions 22A and the coplanar portions 22A are arranged in a plurality of parallel rows 23A with each pair of immediately adjacent portions 22A in one row 23A being interconnected by an associated integral roughly U-shaped portion which is substantially identical to the portion 24 of underlay 20 and defines a channel 25A between the immediately adjacent portions. The carpet underlay 20A also has channels 27A therein defined by integral U-shped portions similar to the U-shaped portions 26 of the carpet underlay 20. The carpet underlay 20A is made utilizing the apparatus and method 35 and supporting means 43. The supporting means 45 is modified slightly by constructing and arranging the mesh material 44 thereof so that elongated strips used therewith extend substantially parallel to the direction of the movement 70, also shown in FIG. 8. The positions that such elongated strips would normally be arranged in the mesh material are shown at a few typical locations relative to the carpet underlay 20A in FIG. 8 by dot-dash lines and designated by the reference numeral 53A.

Figure 9:
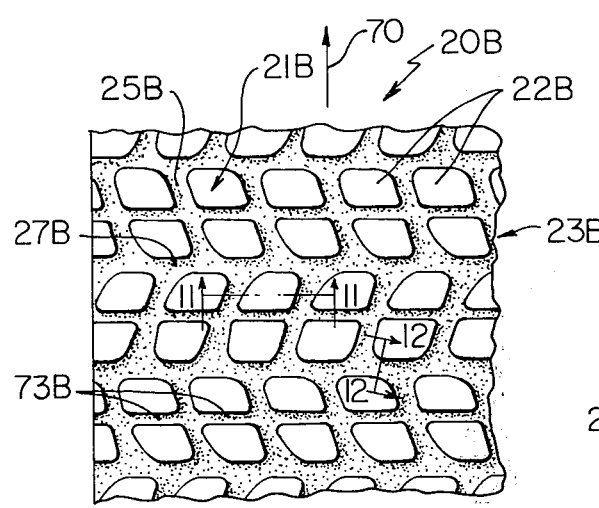
FIG. 9 is a view similar to FIG. 7 illustrating another exemplary embodiment of carpet underlay of this invention.

The carpet underlay material 20B, shown in FIG. 9, also has a substantially plnar load-carrying surface 21B which is defined by a plurality of cooperating coplanar portions 22B. Each portion 22B is arranged in at least one row 23B with each pair of immediately adjacent portions 22B in the one row being interconnected by an associated integral U-shaped portion similar to the U-shaped portion 24 to define a channel 25B therebetween. The associated pair of immediately adjacent portions 22B in a pair of rows 23B are interconnected by U-shaped portions similar to portion 26 to define a channel 27A therebetween.

Figure 6:
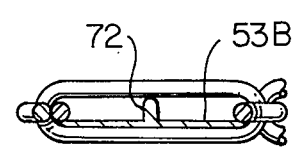
FIG. 6 is a view similar to FIG. 4 illustrating another exemplary embodiment of elongated strip means having a formed central portion and being installed in the mesh material.
Figure 3:
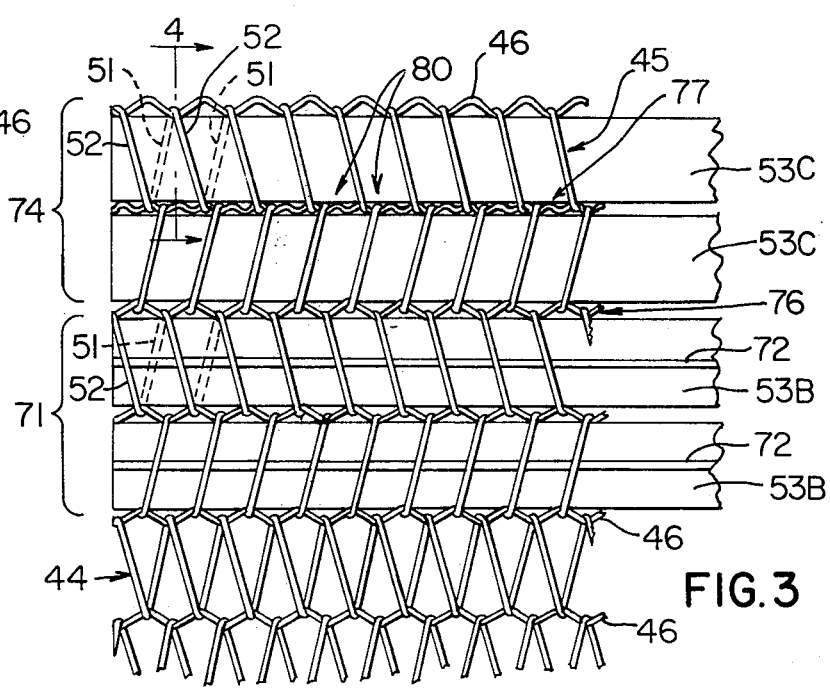
FIG. 3 is a fragmentary plan view similar to FIG. 2 illustrating another embodiment of supporting means which may comprise the apparatus of FIG. 1 and which employs another embodiment of a mesh material which may use two exemplary types of elongated strip means; and, also illustrating a certain portion of the mesh material with the strip means removed.

The carpet underlay 20B is preferably made using the apparatus and method 35 modified to utilize the modified mesh material 44 and formed strip means or elongated strips 53B as shown in the bracketed central portion 71 of FIG. 3. Each strip 53B has a formed central portion, also see FIG. 6, defined by an upstanding projection 72 and the projection 72 defines corresponding channels 73B in the carpet underlay 20B. The strips 53B utilized in association with the mesh material 44 of FIG. 3 are arranged so that they extend perpendicular to the direction of rectilinear movement 70 of the mesh material 44 through the heat tunnel 37.

Figure 10:
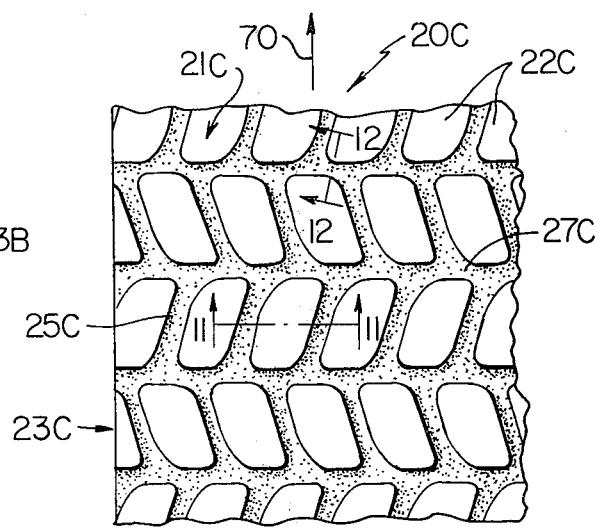
FIG. 10 is a view similar to FIG. 7 illustrating another exemplary embodiment of carpet underlay of this invention.

The carpet underlay 20C illustrated in FIG. 10 has a substantially planar load-carrying surface 21C defined by a plurality of cooperating coplanar portions 22C. Each of the coplanar portions is arranged in the least one row 23C with each pair of immediately adjacent portions in one row being interconnected by as associated roughly U-shaped portion which defines a channel 25C therebetween. The coplanar portions 22C are arranged in a plurality of rows 23C and a pair of adjacent portions 22C arranged in a pair of rows are interconnected by an associated roughly U-shaped portion which defines a channel 27C therebetween.

Figure 4:
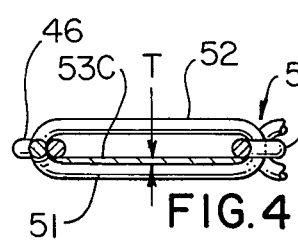
FIG. 4 is a view with parts in cross section and parts broken away taken essentially on the line 4—4 of FIG. 3 particularly illustrating one embodiment of strip means installed in the mesh material in one position.

The carpet underlay 20C is preferably made utilizing the apparatus and method 35 which employs modified mesh material 44, illustrated in the bracketed upper portion 74 of FIG. 3, and flat strips 53C held between portions 51 and 52 of the undulating members 45 and confined between tie members 46, also see FIG. 4. The carpet underlay 26C is defined by arranging the flat strips 53C as illustrated in FIG. 4 and it will be seen that, if desired, the tie members 46 need not necessarily be made as illustrated at 76 in FIG. 3 with a comparatively few undulations; but, may be made as illustrated at 77 with a comparatively larger number of undulations. The larger number of undulations as shown at 77 effectively increase (double in this example) the points at which a tie member 46 engages a strip, such as 53C, as shown at 80, to help hold such strip in position in a firmer manner.

Figure 5:
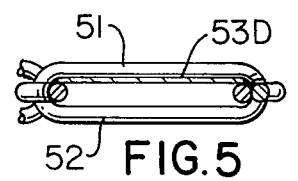
FIG. 5 is a view similar to FIG. 4 illustrating strip means installed in the mesh material in another position to define another exemplary embodiment of carpet underlay.

The carpet underlay 20D illustrated in FIG. 13 is preferably made utilizing the apparatus and method 35 while using the mesh material 44 and the elongated strips arranged as shown in the bracketed upper portion of FIG. 3. Such strips are designated by the reference numeral 53D in FIG. 5.

The carpet underlay 20D also has a substantially planar load-carrying surface 21D defined by a plurality of cooperating coplanar portions 22D. The coplanar portions 22D are arranged in rows 23D and a pair of immediately adjacent portions 22B in one row are interconnected by an associated roughly U-shaped portion 24D as shown in FIG. 14 to define a channel 25D between the pair of immediately adjacent portions 22D in the one row. The channel 25D has a central portion which is closed, as illustrated at 79D and the opposite ends 81D of such channel are open whereby with this construction a maximum load-carrying surface is provided for the carpet underlay 20D which has properties of rebound or resilience and a yielding character substantially similar to corresponding properties of each carpet underlay 20 and 20A–20C; yet, the carpet underlay 20D has strength and which approaches the strength of a substantially solid piece of sponge rubber carpet underlay having a uniform thickness throughout and a pair of opposed continuous or uninterrupted planar surfaces.

The mesh material 44 illustrated in each of FIGS. 2 and 3 may be made of any suitable material and in general such mesh material may be made of a metal wire or may be made of any suitable nonmetallic material capable of being passed through the heat provided by the heat tunnel 37 without detriment thereto.

The elongated strip material or strips 53, 53A, 53B, 53C and 53D are made of any suitable material which is reasonably bendable yet resilient and capable of withstanding the temperatures of the heat tunnel 37. In general, each of these elongated strips must be capable of withstanding between 250° and 500° F. and may be made of metal, teflon, silicone coated glass cloth, and which may be of solid or porous construction.

In some applications of this invention a woven metal cloth of 60 to 100 mesh, a porous teflon, or a porous silicone coated glass cloth may be provided to define the strips to assure that gases released from the sheet of elastomeric material 36 in tunnel 37 are not trapped beneath each planar portion, such as 22, of the carpet underlay defined by such sheet. However, regardless of the material used to define each strip it is preferably made so that it has a minimum thickness which is generally of the order of 0.020 inch thick and is indicated by the letter T in FIG. 4, for example.

Thus, it is seen that various embodiments of improved carpet underlay are provided by this invention as well as an improved apparatus and method for making same. Further, the carpet underlay produced by this invention has a comparatively large load-carrying surface defined by a plurality of coplanar portions which may comprise as much as 90% of the total area of a plan view of such carpet underlay.

While present exemplary embodiments of this invention and methods of practicing the same, have been illustrated and described, it will be recognized that this invention may be otherwise variously embodied and practiced within the scope of the following claims.

What is claimed is:

1. A method of making carpet underlay comprising the steps of forming an endless conveyor means of heat resistor wire-like mesh material having openings with heat resistant elongated flat strips inserted therein, forming a sheet of elastomeric material, depositing said sheet on said mesh material, heating said sheet to soften it and to cause it to droop around said mesh material, forming a plurality of U-shaped channels in the upper surface of said sheet as a result of said droop, limiting said droop on the lower surface of said sheet by means of said strips, further utilizing said strips to prevent said sheet from passing completely through said openings in said mesh material and simultaneously expanding and curing said formed sheet.

2. The method of claim 1 in which said step of heating is provided by a controlled heated environment.

3. The method of claim 1 including the step of forming said mesh material into a plurality of undulating members held together by common tie members to form said openings.

* * * * *